United States Patent

Belinky

Patent Number: 6,116,632
Date of Patent: Sep. 12, 2000

[54] TRAILER HITCH BALL FORMED ONTO STUD

[75] Inventor: Jacob S. Belinky, Carleton, Mich.

[73] Assignee: Draw-Tite, Inc., Canton, Mich.

[21] Appl. No.: 09/099,609

[22] Filed: Jun. 18, 1998

Related U.S. Application Data

[60] Provisional application No. 60/049,925, Jun. 18, 1997.

[51] Int. Cl.⁷ ...................................................... B60D 1/06
[52] U.S. Cl. ............................................................ 280/511
[58] Field of Search ............................. 280/511; 384/206, 384/208; 29/898.046, 439, 441.1, 898.044, 898.045, 511, 444, 283.5

[56] References Cited

U.S. PATENT DOCUMENTS

| | | |
|---|---|---|
| 2,625,736 | 1/1953 | Klages . |
| 2,639,160 | 5/1953 | Studebaker et al. . |
| 3,587,154 | 6/1971 | Potter . |
| 3,736,635 | 6/1973 | Romer et al. . |
| 3,831,244 | 8/1974 | Amos . |
| 3,831,245 | 8/1974 | Amos . |
| 3,952,390 | 4/1976 | Amos . |
| 3,965,554 | 6/1976 | Amos . |
| 4,318,212 | 3/1982 | Schnabel .................................. 29/252 |
| 4,388,012 | 6/1983 | Erickson . |
| 4,433,854 | 2/1984 | Smith . |
| 4,596,406 | 6/1986 | VanVleet et al. . |
| 4,678,199 | 7/1987 | Dickmann . |
| 4,863,185 | 9/1989 | Coppe . |
| 4,889,356 | 12/1989 | Morris . |
| 4,923,205 | 5/1990 | Durm . |
| 4,938,496 | 7/1990 | Thomas et al. . |
| 5,000,474 | 3/1991 | Kristensen . |
| 5,016,898 | 5/1991 | Works et al. . |
| 5,116,072 | 5/1992 | Swenson . |
| 5,143,393 | 9/1992 | Meyer . |
| 5,203,194 | 4/1993 | Marquardt . |
| 5,242,186 | 9/1993 | Pettersson . |
| 5,290,057 | 3/1994 | Pellerito . |
| 5,419,576 | 5/1995 | VanVleet . |
| 5,472,222 | 12/1995 | Marcy . |
| 5,476,279 | 12/1995 | Klemetsen . |
| 5,513,433 | 5/1996 | Sumiyoshi .......................... 29/898.046 |
| 5,577,751 | 11/1996 | Matthews . |

Primary Examiner—Robert J. Oberleitner
Assistant Examiner—C. T. Bartz
Attorney, Agent, or Firm—Leon E. Redman; Lloyd D. Doigan

[57] ABSTRACT

A trailer hitch ball in which a tubular member is formed into a generally spherical configuration while being permanently attached to a central stud. The hitch ball may be formed by crimping a tubular member onto a central stud integrally formed from a drawbar shank producing a combined ball and shank for detachable connection to the receiver of a trailer hitch.

5 Claims, 8 Drawing Sheets

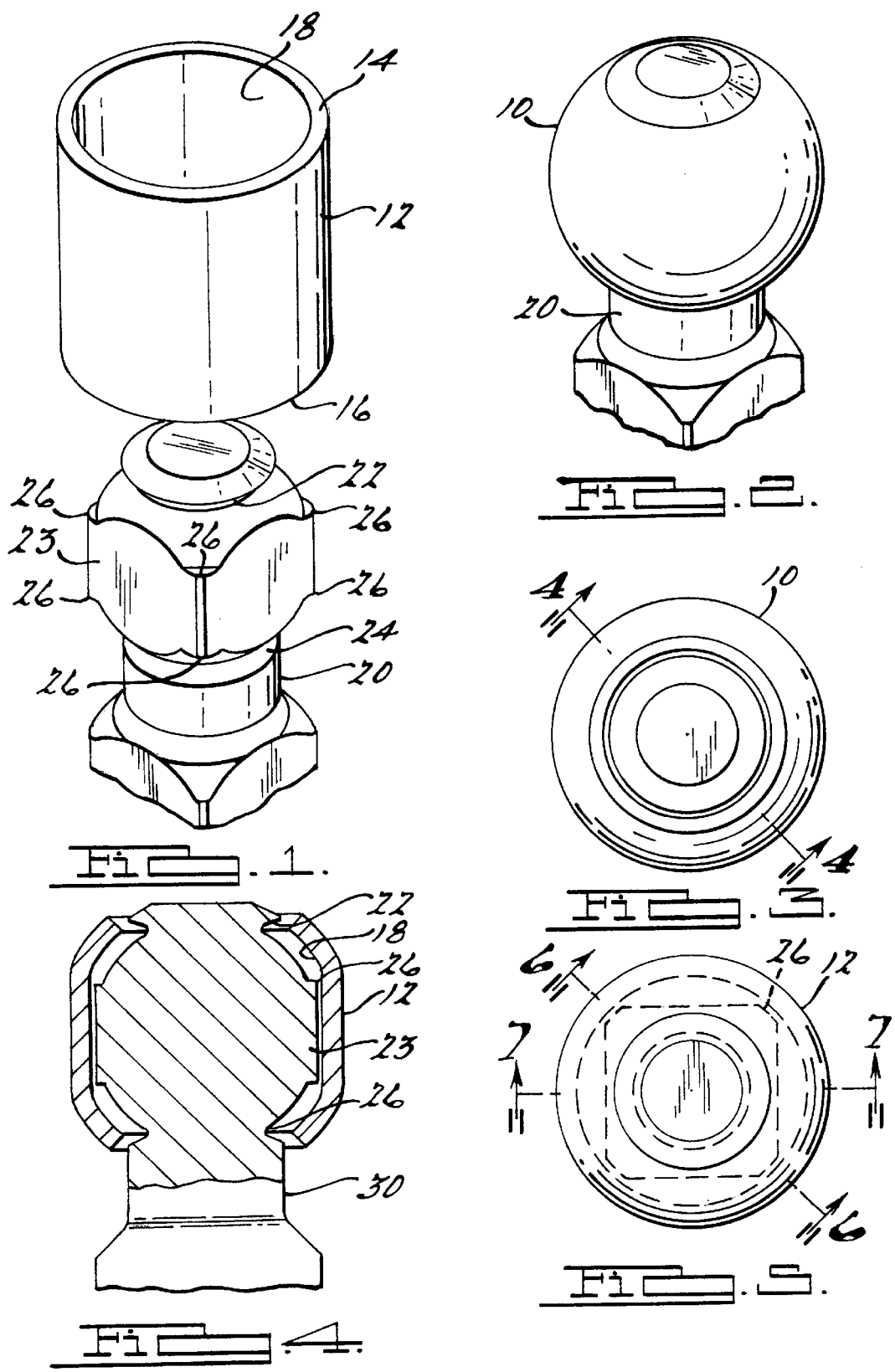

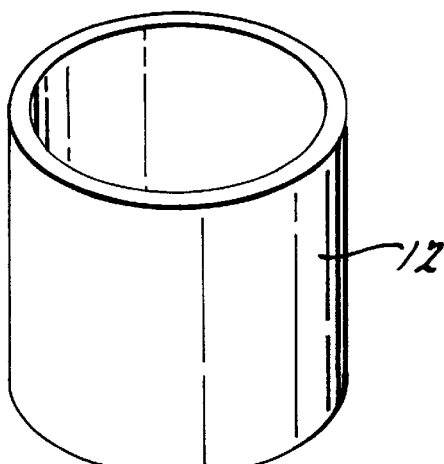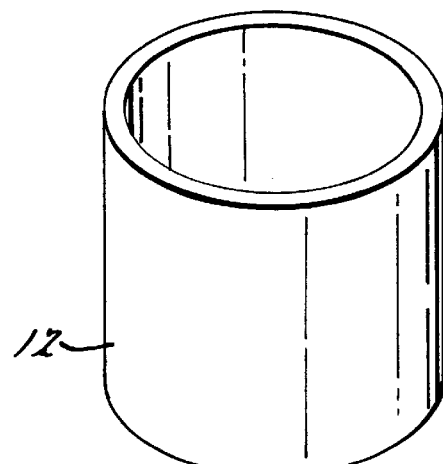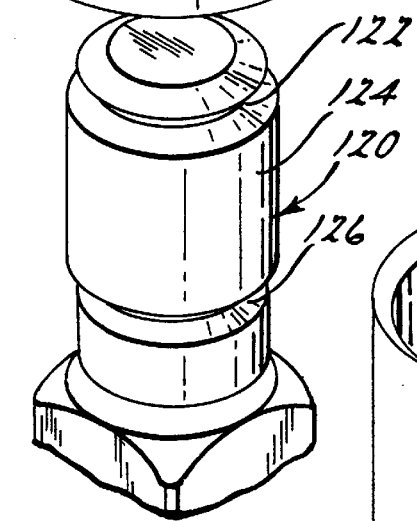

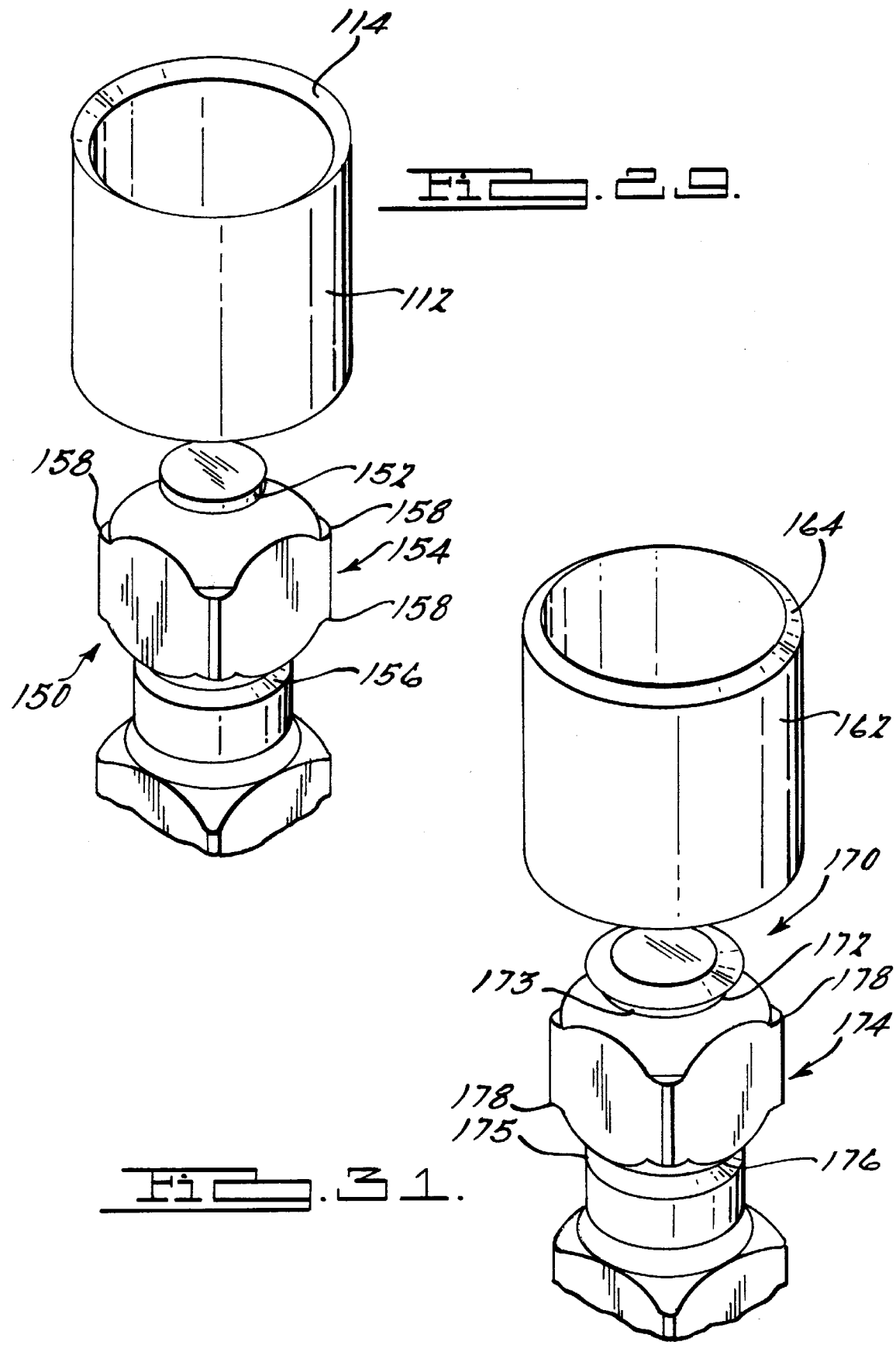

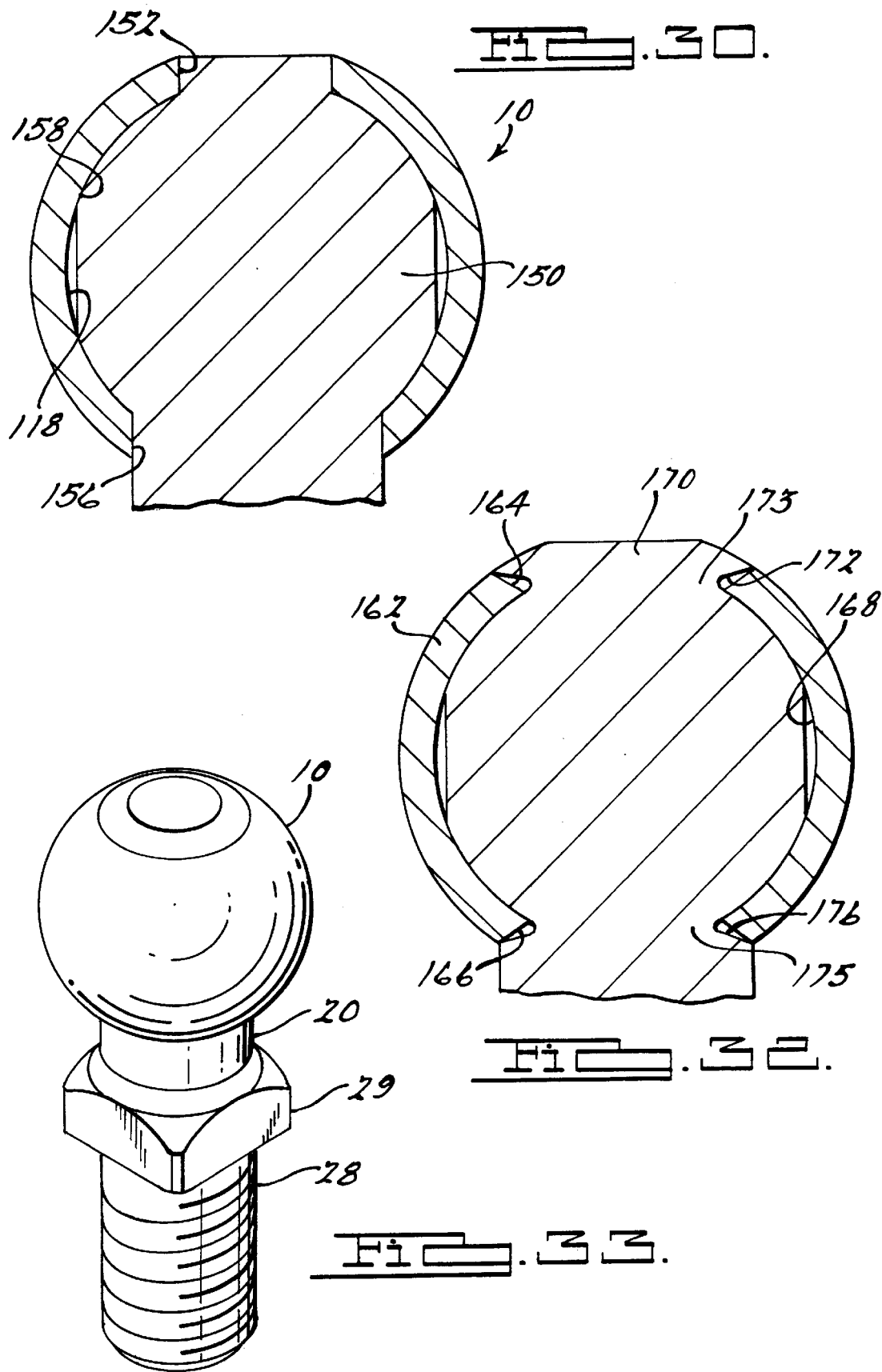

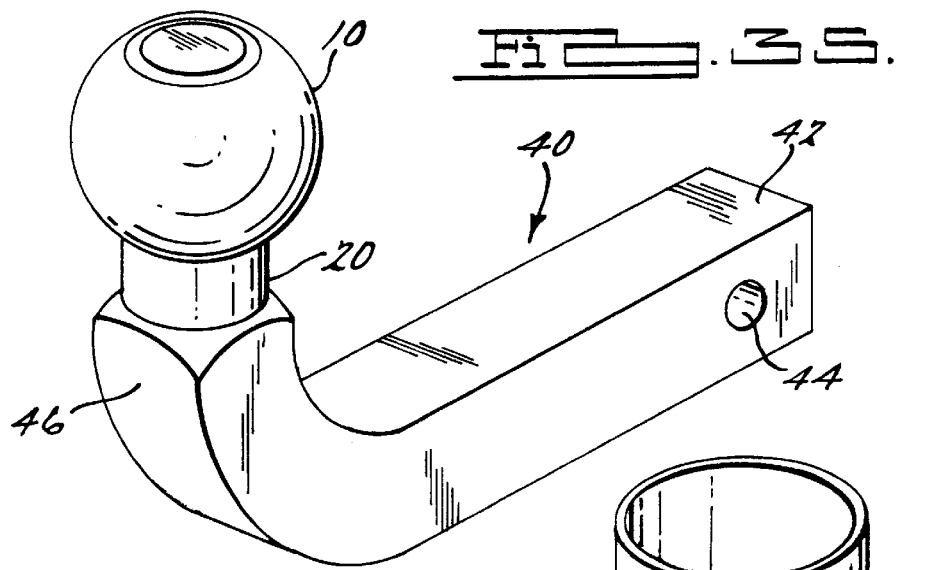
Fig. 35.
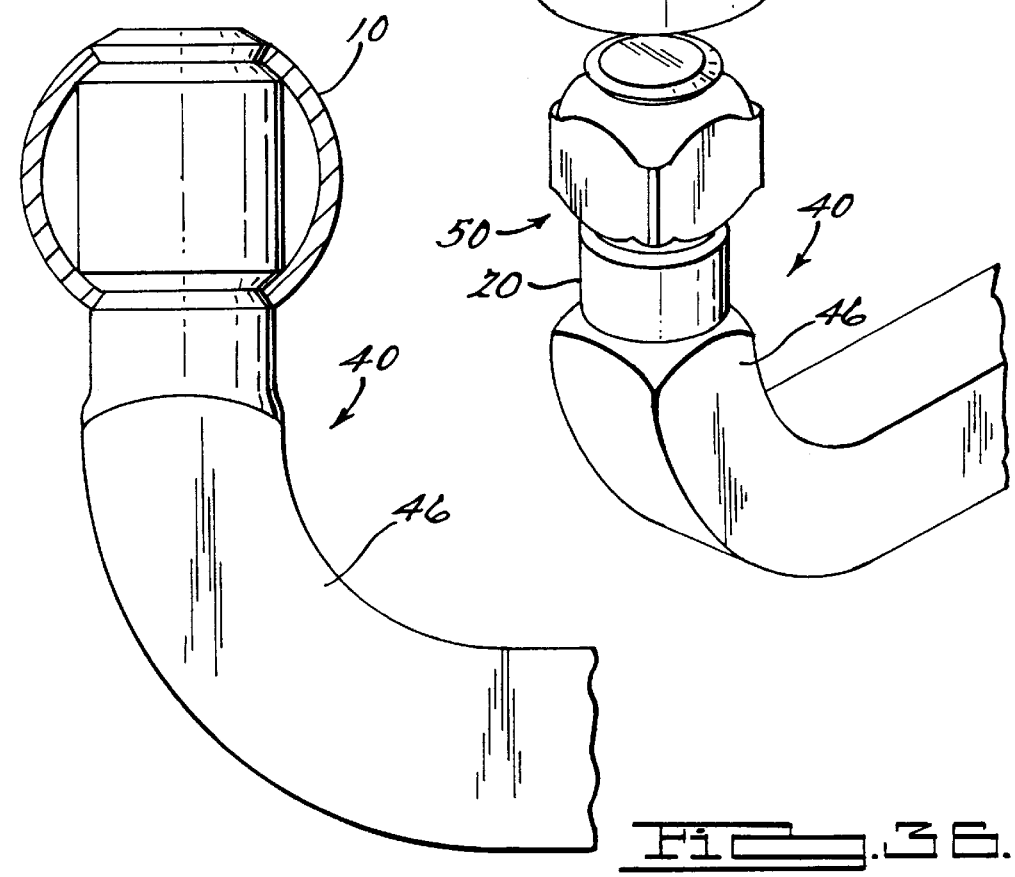
Fig. 34.
Fig. 36.

6,116,632

TRAILER HITCH BALL FORMED ONTO STUD

This application is a continuation of provisional application Serial No. 60/049,925 filed Jun. 18, 1997.

BACKGROUND OF THE INVENTION

FIELD OF THE INVENTION

The present invention relates to a trailer hitch ball mountable on a trailer hitch for detachably connecting a trailer with a towing vehicle. Conventional trailer hitch balls are forged or upset from a uniform stock of metal and then machined to a final finished spherical configuration necessitating the use of a certain amount of material of uniform hardness and resulting in waste material.

SUMMARY OF THE INVENTION

An object of the present invention is to reduce the amount of material required, and thus lower the cost to manufacture a trailer hitch ball.

Another object of the present invention is to enable dissimilar materials and/or material of different hardness to be employed in the component parts of a hitch ball.

These and various other advantages are achieved by the hitch ball of the present invention which includes a spherical ball formed from a tubular member pressed or crimped over a central stud or shank. The shape of the stud or shank can be configured to lock the spherical member onto the stud or shank and prevent the spherical member from being detached. In one embodiment of the present invention the spherical member is crimped onto a shank integrally formed at one end of a drawbar.

BRIEF DESCRIPTION OF THE DRAWINGS

FIG. 1 is an exploded partially fragmented perspective view of a pre-crimped tubular member and a stud of the trailer hitch ball of the present invention;

FIG. 2 is a fragmentary perspective of the trailer hitch ball of the present invention with the tubular member crimped onto the stud;

FIG. 3 is a top view of the tubular member partially crimped onto the stud;

FIG. 4 is a fragmentary cross-section elevational view taken along lines 4—4 of FIG. 3;

FIG. 5 is a top view of the hitch ball of FIG. 2;

FIG. 15 is an exploded perspective view of the pre-crimped tubular member and partially fragmented stud in an alternate configuration;

FIGS. 19 through 22 show another embodiment with an alternate stud configuration;

FIGS. 23 through 26 show another embodiment with an alternate stud configuration;

FIG. 29 is an exploded fragmented perspective view of a pre-crimped tubular member having an inwardly chamfered upper and lower edge and an alternate configuration of the stud;

FIG. 30 is an enlarged cross-section elevational fragmented view of an inwardly chamfered tubular member crimped onto the alternate stud configuration of FIG. 29;

FIG. 31 is an exploded fragmented perspective view of a pre-crimped tubular member having an outwardly chamfered upper and lower edge and an alternate configuration of the stud;

FIG. 32 is an enlarged cross-sectional fragmented view of an outwardly chamfered tubular member crimped onto the alternate stud configuration of FIG. 31;

FIG. 33 is a perspective view of a tubular member crimped onto a stud having a threaded lower portion for conventional attachment to a drawbar;

FIG. 34 is an exploded fragmented perspective view of a pre-crimped tubular member and a stud formed at an upwardly projecting end of a shank of a drawbar;

FIG. 35 is a perspective view of a tubular member crimped onto a stud formed at the upwardly extending end of a shank of a drawbar; and FIG. 36 is a side elevational view in partial cross-section and partially fragmented of the embodiment of FIG. 35.

DESCRIPTION OF THE PREFERRED EMBODIMENT

Figure 6:
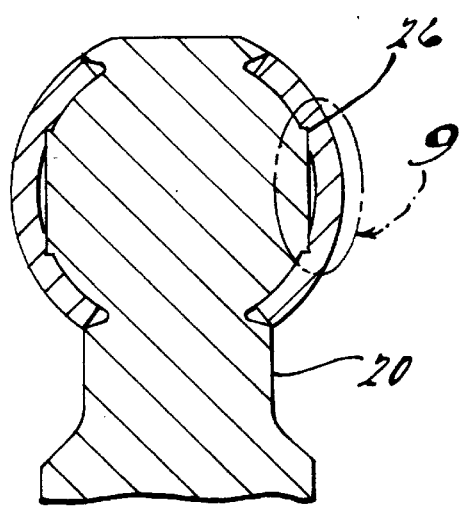
FIG. 6 is a fragmentary cross-section elevational view taken along lines 6—6 of FIG. 5.

Referring to the drawings, a trailer hitch ball 10 in FIGS. 2, 33 and 35 is formed onto a stud or shank 20. The generally spherical shaped trailer hitch ball 10 is formed from a cylindrical tubular member 12. The cylindrical tubular member 12 is cut to a predetermined desired length from cylindrical tubing having an outside diameter slightly smaller than the diameter of the final formed trailer hitch ball 10. This compensates for the slight expansion of the tubular member 12 as it is formed onto the stud or shank 20 and minimizes any possible parting lines at the equator of the ball 10.

The stud or shank 20 may be cut to length and stamped or cold forged to a desired shape and then machined to a desired profile configuration as will be described in greater detail. A benefit of forming the generally spherical ball 10 from tubing 12 is that the initial stock size of the stud or shank 20 can be reduced, thereby reducing material and costs without sacrificing strength or performance.

The stud 20 is machined into a configuration in which a top portion 22 and lower portion 24 are configured to receive the top edge 14 and bottom edge 16, respectively, of the tubular member 12 fully crimped onto the stud 20 to permanently attach the hollow ball 10 to the stud 20.

Figure 9:
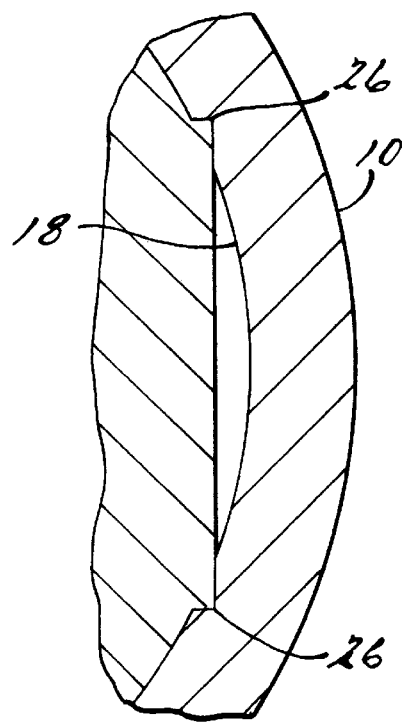
FIG. 9 is a greatly enlarged view of area 9 of FIG. 6 showing the corners of the stud biting into the inside of the spherical member crimped onto the stud.
Figure 7:
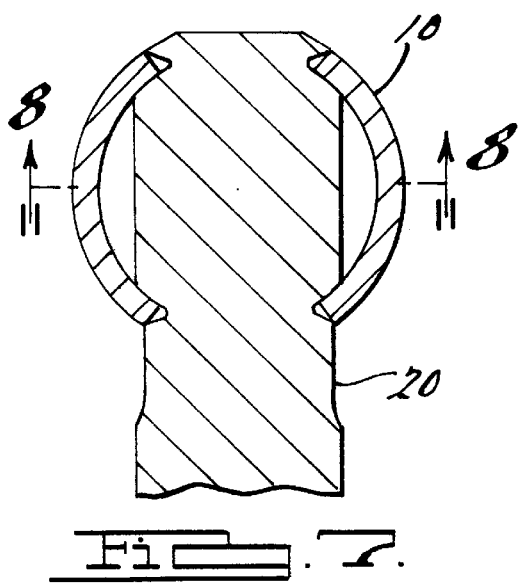
FIG. 7 is a fragmentary cross-section elevational view taken along lines 7—7 of FIG. 5.
Figure 8:
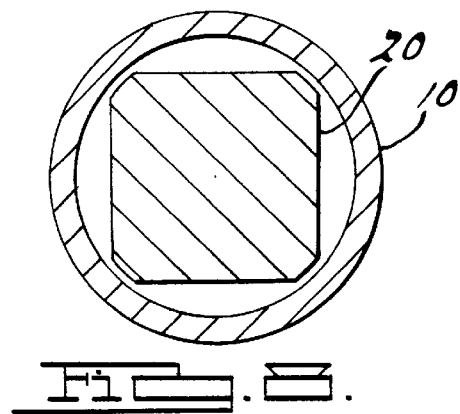
FIG. 8 is a cross-section plan view taken along lines 8—8 of FIG. 7.
Figure 10:
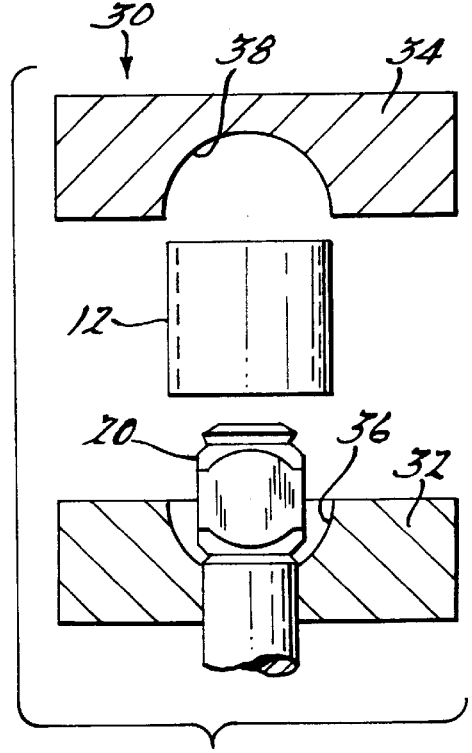
FIGS. 10 through 14 are side elevation views, partially in section showing a method of crimping a tubular member onto a stud to form a spherical trailer hitch ball.
Figure 11:
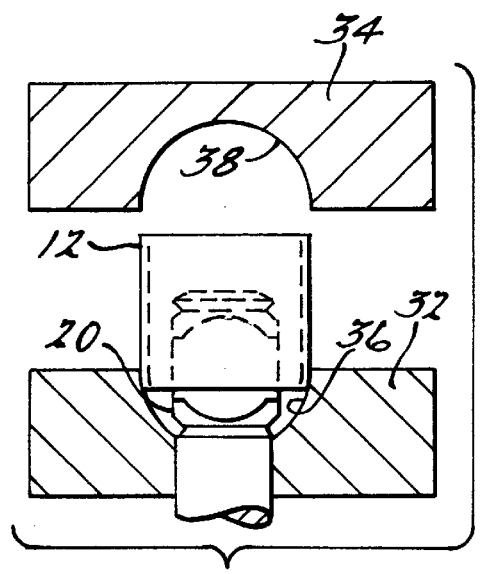
Figure 12:
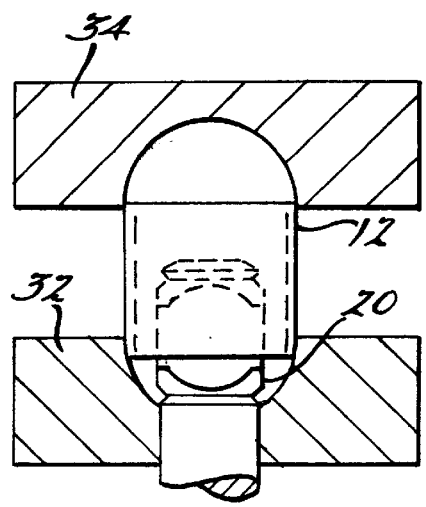
Figure 13:
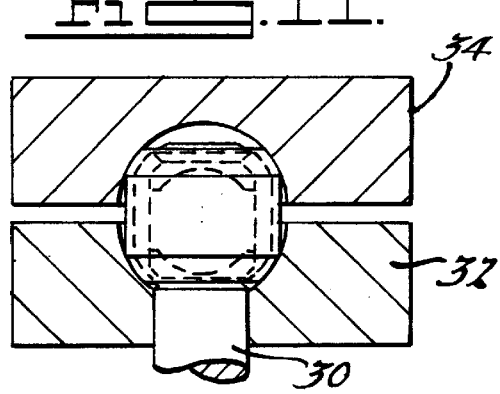
Figure 14:
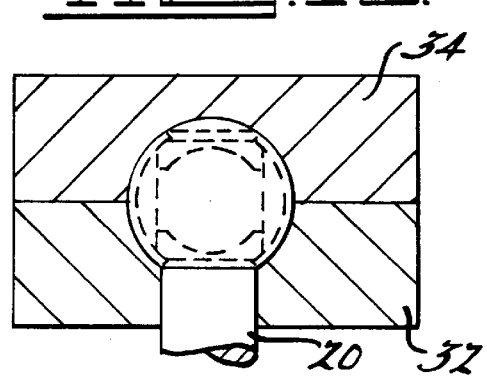

In a preferred embodiment, the stud 20 is configured with a plurality of circumferentially spaced corners 26 machined in a middle portion of the stud 20. As best seen in FIGS. 6 and 9 the corners 26 bite into inner surface 18 of the tubular member 12 or it is formed onto the stud and thereby prevent rotation of the generally spherical ball 10 relative to the stud 20 after assembly and during use. In addition, the stud corners 26 are positioned about the middle portion 23 to contact the inner surface 18 while the tubular member 12 is being formed onto the stud 20 to assist in centering the tubular member 12 on the shank or stud 20 (see FIGS. 5 and 6).

Referring to FIGS. 10–14, the method of crimping the tubular member 12 onto the stud 20 to form the generally spherical trailer hitch ball 10 is shown. The stud or shank 20 having been machined into a desired configuration such as previously described is inserted upwardly through the lower portion 32 of a split swagging die 30 provided with a generally hemi-spherical bowl 36 provided in the lower portion. The tubular member 12 is positioned about the upwardly extending stud 20 and below the upper die member 34 of the split die 30, the upper die member is also provided with a hemi-spherical bowl 38 opposite bowl 36. The opposing dies 32, 34 are forced together forming the tubular member 12 into a generally spherical ball 10 securely attached to the stud 20. The split die 30 is opened and the trailer hitch ball 10 formed onto the stud or shank 20 is removed.

Figures 16, 17, 18:
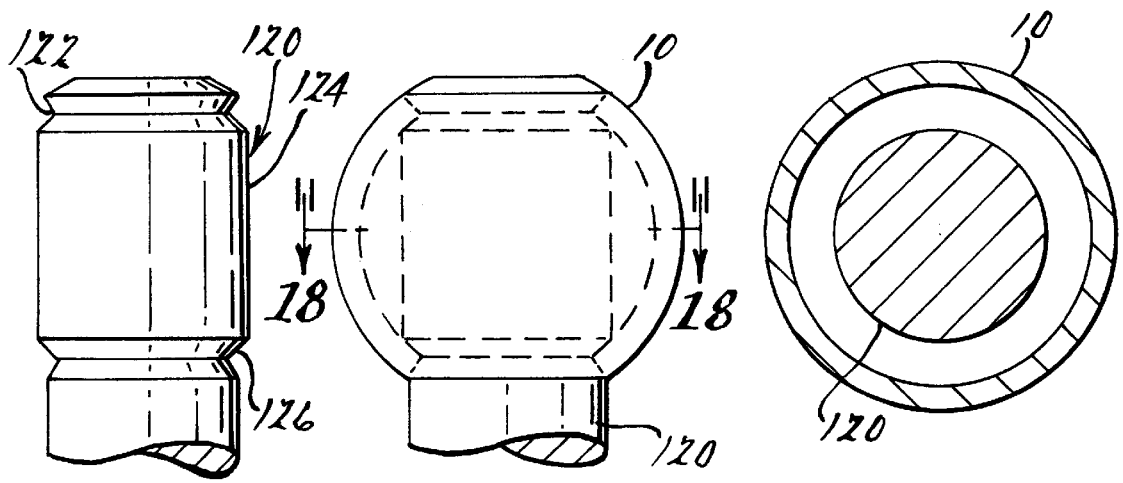
FIG. 16 is a fragmented elevational view of the stud of FIG. 15.
FIG. 17 is a side elevational view of the tubular member of FIG. 15 crimped onto the stud of FIGS. 15 and 16.
FIG. 18 is a cross-sectional view taken along lines 18—18 of FIG. 17.
Figures 20, 21, 22:
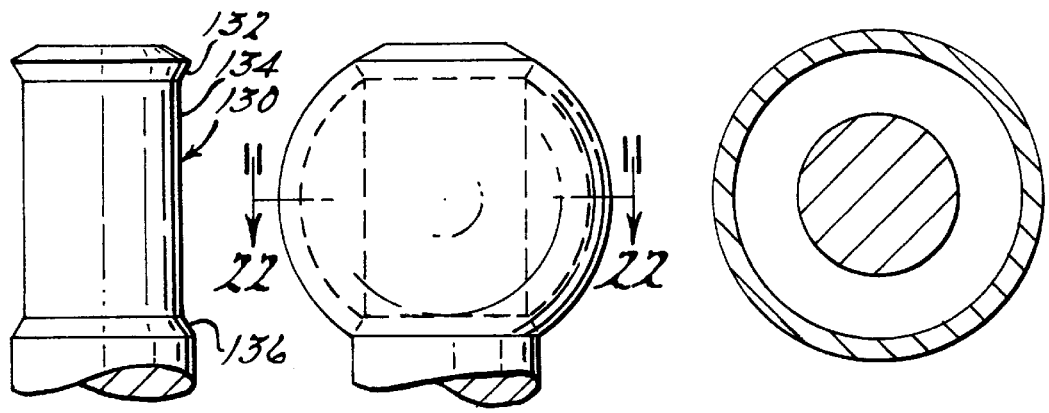
Figures 24, 25, 26:
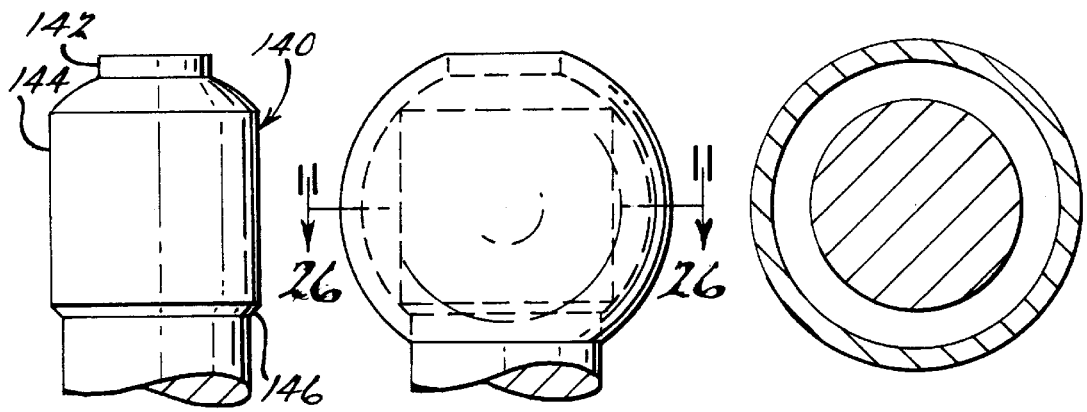

FIGS. 15, 17 and 18 show the tubular member 12 formed directly onto an alternate stud 120 (FIG. 16) which has a generally cylindrical middle area 124 between a top portion 122 and a lower portion 126. The top portion 122 and lower portion 126 are each provided with an annular V-shaped undercut about the circumference of the stud 120 to receive, respectively, the top edge 14 and the bottom edge of the tubular member 12 as described previously with respect to FIGS. 1–14. The configuration of stud 120 provides for reduced material and machining in comparison to stud 20.

FIGS. 19–22 illustrate the use of another alternate stud 130 on which the hollow trailer hitch ball 10 of the present invention can be directly formed from the tubular member 12. Stud 130 is configured to have a reduced diameter middle portion 134 extending from a top ledge 132 to a lower ledge 136.

FIGS. 23–26 show another embodiment of the present invention. In this embodiment an alternate stud 140 is configured as shown to have an enlarged diameter cylindrical middle portion 144 between a recessed vertical walled annular neck 142 and a lower recessed vertical walled annular leg 146 which along with the enlarged middle portion 144 serve to securely attach the hollow trailer hitch ball 10 to the stud 140 after it has been formed thereon as previously described. The tubular member 112 (FIGS. 23 and 27) is provided with an inwardly directed top chamfer 114 and an inwardly directed lower chamfer 116 (FIG. 27) so that the tubular member 112 abuts the annular recesses 142, 146, respectively, of the stud 140 when the tubular member 112 has been formed thereon.

Figures 27, 28:
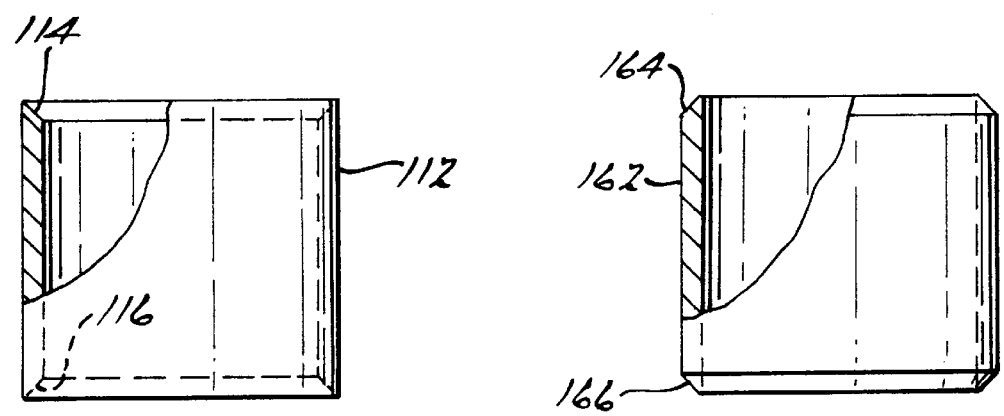
FIG. 27 is a partially fragmented side elevational view of a tubular member having an inwardly chamfered upper and lower edge.
FIG. 28 is a partially fragmented side elevational view of a tubular member having an outwardly chamfered upper and lower edge.

FIGS. 27, 29 and 30 show the tubular member 112 with inwardly directed chamfered ends 114, 116 formed onto an alternate stud 150 having a recessed vertical walled annular neck 152 and a vertical walled annular leg 156, with a multi faceted middle portion 154 configured to provide a plurality of corners 158 about the periphery thereof which corners 158 bite into the inner surface 118 of the tubular member 112 formed directly onto the stud 150 to prevent rotation of the trailer hitch ball 10 relative to the stud 150.

FIGS. 28, 31 and 32 show a tubular member 162 with outwardly directed chamfered ends 164, 166 formed onto an alternate stud 170 having an outwardly flanged shoulder providing an upper annular groove 172 machined into a top portion 173 of stud 170 and a lower annular groove 176 machined into a lower portion 175 of stud 170. The stud 170 is configured with a multi-faceted middle portion 174 to provide a plurality of corners 178 about the periphery thereof to bite into the inner surface 168 of the tubular member 162.

Referring to FIG. 33, the hollow trailer hitch ball 10 can be directly formed onto a stud 20 provided with a threaded portion 28 extending downwardly from a nut 29 configured on the stud 20 for conventional attachment of the hollow trailer hitch ball 10 to a trailer hitch (not shown).

Referring to FIGS. 34–36, a stud 20 can be machined or forged as an integral portion of a one piece stud/drawbar 40 which is made by cutting a shank 42 to a predetermined length, drilling an attachment hole 44, and bending an end 46 of the shank 40 upward. A stud portion 50 may be stamped into the upwardly bent end 46. The stud portion 50 is then machined to a desired profile or configuration such as any of the various stud configurations previously described. The tubular member 12 is positioned over the stud 20 and formed directly thereon into a hollow generally spherical trailer hitch ball 10 in the manner previously described.

The foregoing is a description of the preferred embodiment and many alternate embodiments of the invention which may be modified without departing from the spirit or the scope of the following claims and their equivalents.

What is claimed is:

1. A trailer hitch ball formed directly onto a substantially non-spherical stud comprising:
   a vertically extending substantially non-spherical stud;
   a tubular member formed into a generally spherical hollow member directly onto said substantially non-spherical stud with said generally spherical hollow member formed with an opening at its top and bottom, the top opening of said generally spherical hollow member formed about the top portion of said substantially non-spherical stud and the bottom opening of said generally spherical hollow member formed about the lower portion of said substantially non-spherical stud to permanently attach said generally spherical hollow member to said substantially non-spherical stud.

2. The trailer hitch ball of claim 1 including a drawbar having one end bent vertically upward, and wherein said substantially non-spherical stud is integrally formed in said one end of said drawbar.

3. The trailer hitch ball of claim 1 wherein said substantially non-spherical stud is configured with a plurality of corners that bite into the inner surface of said generally spherical hollow member to prevent rotation of said hitch ball formed directly onto said substantially non-spherical stud.

4. A method of forming a trailer hitch ball directly onto a substantially non-spherical stud comprising:
   positioning a cylindrical tubular member about a substantially non-spherical stud;
   forming the cylindrical tubular member, positioned about said substantially non-spherical stud, into a generally spherical hollow ball; and
   crimping the ends of said cylindrical tubular member onto the substantially non-spherical stud to permanently attach the generally spherical hollow ball to the substantially non-spherical stud.

5. A trailer hitch ball formed directly onto a stud comprising:

a vertically extending stud;

a tubular member formed into a generally spherical hollow member directly onto said stud with said generally spherical hollow member formed with an opening at its top and bottom, the top opening of said generally spherical hollow member formed about the top portion of said stud and the bottom opening of said generally spherical hollow member formed about the lower portion of stud to permanently attach said generally spherical member to said stud, said stud being configured with a plurality of corners that bight into the inner surface of said generally spherical hollow member to prevent rotation of said hitch ball formed directly onto said stud.

* * * * *